United States Patent [19]

Yamaguchi

[11] Patent Number: 5,593,102
[45] Date of Patent: Jan. 14, 1997

[54] SPINNING REEL FOR FISHING HAVING A MECHANISM FOR LINKING THE SPOOL REVERSE PREVENTIVE AND THE DRAG DEVICE

[75] Inventor: Akira Yamaguchi, Saitama, Japan

[73] Assignee: Daiwa Seiko, Inc., Tokyo, Japan

[21] Appl. No.: 391,348

[22] Filed: Feb. 21, 1995

[30] Foreign Application Priority Data

Feb. 24, 1994 [JP] Japan .................................. 6-049980
Mar. 4, 1994 [JP] Japan .................................. 6-058311

[51] Int. Cl.$^6$ ..................................................... A01K 89/01
[52] U.S. Cl. ........................................... 242/246; 242/247
[58] Field of Search ................................... 242/244, 245, 242/246, 247, 248

[56] References Cited

U.S. PATENT DOCUMENTS

| | | | |
|---|---|---|---|
| 4,300,730 | 11/1981 | Carlsson et al. | 242/248 |
| 4,634,074 | 1/1987 | Ohmori . | |
| 4,650,134 | 3/1987 | Councilman . | |
| 4,746,077 | 5/1988 | Toda . | |
| 4,776,526 | 10/1988 | Saito | 242/245 |
| 4,834,307 | 5/1989 | Larsson et al. | 242/245 |
| 5,186,412 | 2/1993 | Park | 242/245 |
| 5,195,698 | 3/1993 | Kyoichi | 242/245 |
| 5,201,477 | 4/1993 | Kawabe | 242/245 |
| 5,470,027 | 11/1995 | Hlava et al. | 242/247 |

FOREIGN PATENT DOCUMENTS 61-274638  12/1986  Japan .
2-405  1/1990  Japan .

*Primary Examiner*—Daniel P. Stodola
*Assistant Examiner*—William A. Rivera
*Attorney, Agent, or Firm*—Longacre & White

[57] ABSTRACT

A spinning reel for fishing, with which switch-over operation can be performed simply, quickly and positively in setting a condition where a spool shaft or rotor can be rotated reversely to play out a fishline. A switch-over mechanism (B) is provided for a spool (2) to switch over a spool shaft (4) between the secured and freely rotatable states. A linking mechanism (C) is provided between a reversal preventive device (16) provided for a rotor (13) and the switch-over mechanism (B) so that when the reversal preventive device (16) prevents the reverse rotation of the rotor (13), the switch-over mechanism (B) switches over the spool shaft (4) into the freely rotatable state and, when the reversal preventive device (16) removes the prevention of the reverse rotation of the rotor (13), the switch-over mechanism (B) switches over the spool shaft (4) into the secured state.

11 Claims, 7 Drawing Sheets

5,593,102

SPINNING REEL FOR FISHING HAVING A MECHANISM FOR LINKING THE SPOOL REVERSE PREVENTIVE AND THE DRAG DEVICE

BACKGROUND OF THE INVENTION

The present invention relates to a spinning reel for fishing, and, in particular, to a switch-over mechanism capable of switching over a spool between a drag operation state and a freely rotatable state, which is installed in the spinning reel.

A drag mechanism for a spinning reel for fishing is generally structured such that a drag force can be controlled gradually by rotating a drag control knob. However, an actual fishing requires various kinds of operations: for example, an operation for switching over a spool from the drag operative state to the freely rotatable state while maintaining a state where the reverse rotation of a rotor is prevented with a rotor reversal preventive device, an operation for switching the spool over to the drag operative state immediately after fish is caught in a state that the spool is held in the freely rotatable state, and so on, in order to prevent a fishline from being cut, to prevent the mouth of fish caught from being damaged or cut away, and to facilitate deep biting of fish. In order to be able to deal with the above fishing operations, an arrangement in which a drag mechanism can be switched over between the drag operative state and the spool freely rotatable state is proposed, as disclosed in Japanese Patent Publications Sho. 61-274638, Hei. 2-405 and the like.

Further, the actual fishing requires so-called rotor reversible fishing operation: That is, the reverse rotation preventive state of the reversal preventive device is released to set for the rotor a forwardly and reversely rotatable state that the rotor can be rotated forwardly or reversely by rotating a handle to play out or take up the fishline. This rotor reversible fishing operation is usable, for instance, in such a situate that an angler wishes to move the position of the terminal tackles closer or further when he awaits the biting of the fish awaited with the spool held in the spool freely rotatable state.

However, in order to perform the rotor reversible fishing operation, the prevention of the reverse rotation of the rotor by the rotor reversal preventive device must be released each time and at the same time the spool must be switched into the secured state. Similarly, in order to switch the rotor reversible fishing state over to the spool freely rotatable state, the rotor reversal preventive device must be switched over to the rotor reversal preventive state as well as the switch-over mechanism must be switched from the secured state to the freely rotatable state. If the angler forgets this necessary switch-over operation, then the spool and rotor will be rotated together, so that the fishline may be slacked off or the fishline cannot be played out smoothly.

SUMMARY OF THE INVENTION

Accordingly, it is an object of the invention to provide a spinning reel for fishing which not only can deal with the above-mentioned various fishing operations easily and positively but also is simplified in structure and is improved in operationability.

In order to attain the above-noted and other objects, the invention provides, as a preferred embodiment, a spinning reel for fishing in which a spool having a drag mechanism is provided in the front portion of a spool shaft which can be reciprocated back and forth by rotating a handle. A switch-over mechanism is provided for the spool shaft to switch over the spool shaft between a secured state and a freely rotatable state. An engageable and disengageable reversal preventive device is provided for a rotor to selectively prevent the reverse rotation of the rotor. Further, a linking mechanism having a switch-over lever is provided between the switch-over mechanism and reversal preventive device. The linking mechanism is structured in such a manner that, when the switch-over mechanism secures the spool shaft, the reversal preventive device releases the prevention of the reverse rotation of the rotor and, when the switch-over mechanism holds the spool shaft in the freely rotatable state, the reversal preventive device secures the rotor. The linking mechanism may be provided with a control means for switching over the reversal preventive device between the engaged and disengaged states thereof when the switch-over mechanism secures the spool shaft. Another reverse rotation preventive device may be provided for the rotor alternatively.

To return the linking and switch-over mechanisms from their positions for the spool shaft freely rotatable state back to their positions for the spool shaft secured state, the switch-over lever of the linking mechanism is operated manually. Alternatively, there may be provided a return projection in a drive gear and an operation projecting portion in a switch-over member included in the switch-over mechanism in such a manner that the return projection can be brought into abutment with the operation projecting portion. With this structure, the return operation can be performed automatically by means of the rotational operation of the handle. That is, this structure is further advantageous in that it can realize a better return operation.

DETAILED DESCRIPTION OF THE PREFERRED EMBODIMENTS

Figure 1:
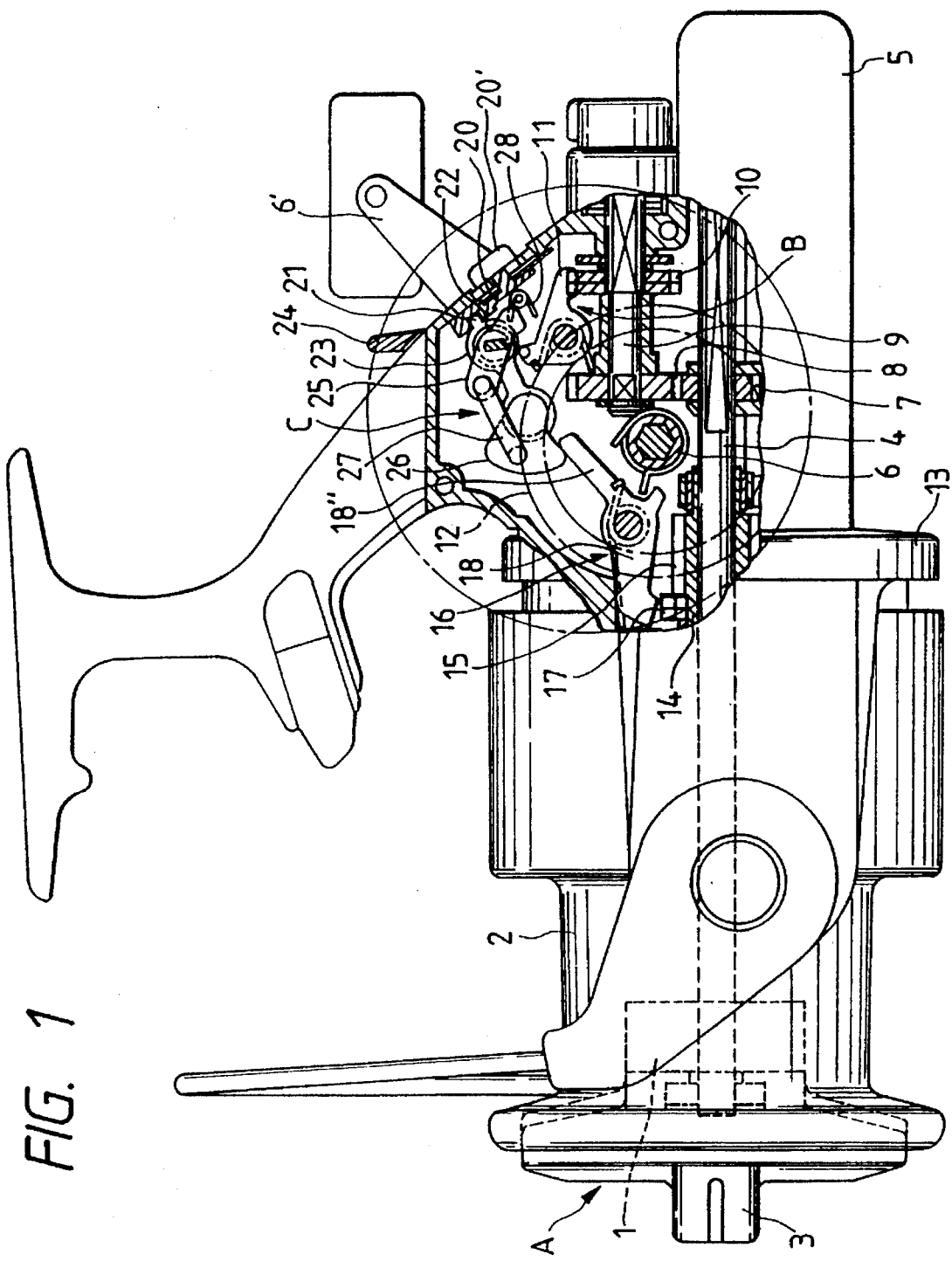
FIG. 1 is a partially cutaway front view of a spinning reel for fishing according to a first embodiment of the invention.

Preferred embodiments of the present invention will now be described with reference to the drawings attached hereto.
First Embodiment
FIGS. 1 to 7 show a spinning reel for fishing according to a first embodiment of the present invention.

In the spinning reel, a drag mechanism A having a friction brake member 1 and a control knob 3 for pressing the friction brake member 1 against a spool 2 is mounted to a front portion of a spool shaft 4 in a well known manner. The spool shaft 4 is supported by a reel main body 5 in such a manner that it can be slid axially and can be rotated. Further, the spool shaft 4 is coupled to a well-known reciprocative slide mechanism (not shown) so that the spool shaft 4 can be slid back and forth in linking with the rotation of a handle shaft 6 having a handle 6'.

A transmission gear 7 is installed in a reel main body 5, which can be rotated integrally with the spool shaft 4 and slid relative to the spool shaft 4. The position of the transmission gear 7 in the axial direction of the spool shaft 4 is restricted by a support portion 5' of the reel main body 5. A linking shaft 9 is supported by the reel main body 5 at a position above the spool shaft 4 and in the rear portion of the interior of the reel main body 5. A driven gear 8 meshable with the transmission gear 7 is fixed to the linking shaft 9. The linking shaft 9 is formed with a cutaway circular or incomplete circular shaft portion 9' on which a securing gear 10 is provided. On the other hand, a switch-over member 11 is pivotably supported on the reel main body 5 so that the switch-over member 11 is engageable with and disengageable from the securing gear 10 and is energized in the engaging direction by a spring 11'. Thus, a switch-over mechanism B for switching the spool shaft 4 between the secured state and the freely rotatable state is structured.

A drive gear 12, which is provided on the handle shaft 6, is meshed with a pinion 15 formed in a rotor rotary shaft cylinder 14 to which a rotor 13 is fixed. A reversal preventive device 16 is provided for the rotor 13 in an engageable and disengageable manner. That is, the reversal preventive device 16 is made up of a reversal preventive ratchet wheel 17 fixed to the rotor rotary shaft cylinder 14 and a securing pawl 18 which is engageable with and disengageable from the reversal preventive ratchet wheel 17 and is energized in the engaging direction by a spring 18'.

Figure 4:
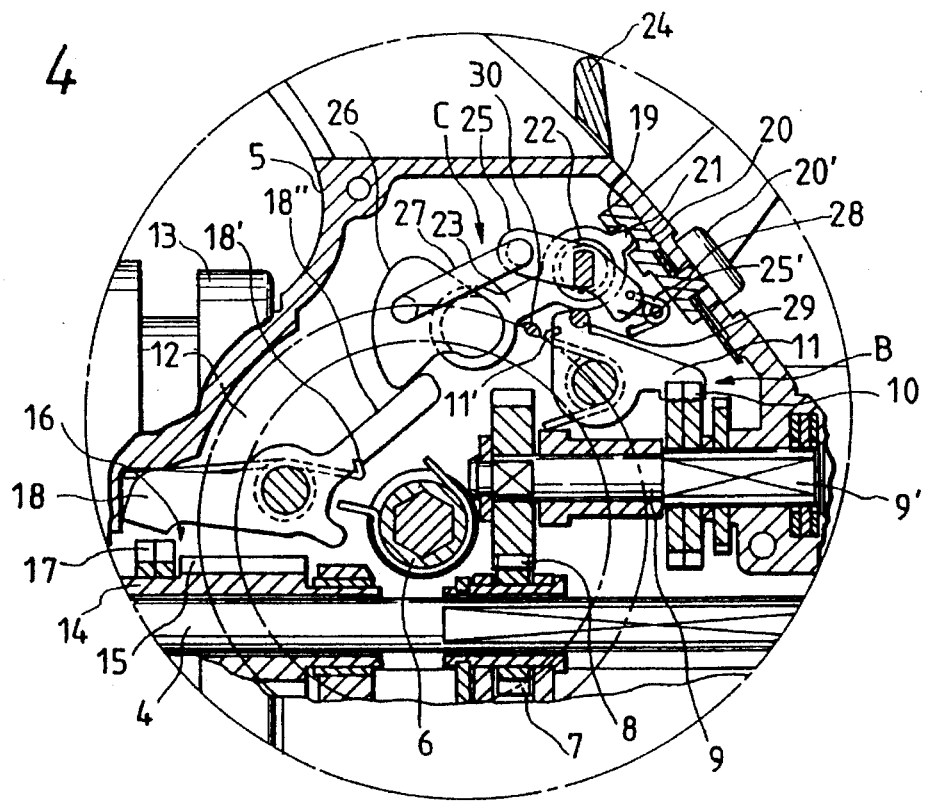
FIG. 4 is a longitudinal sectional front view of the above reel, showing a state in which a rotor is held in the reversely rotatable state.
Figure 5:
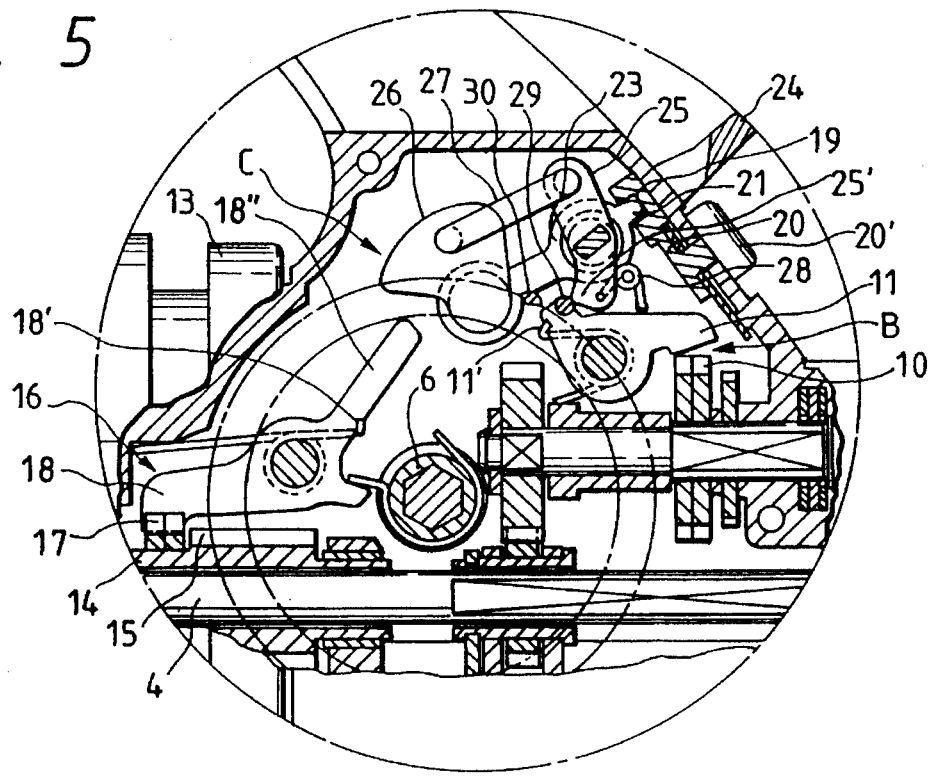
FIG. 5 is a longitudinal sectional front view of the above reel, showing a state in which the spool shaft is held in the freely rotatable state.
Figure 6:
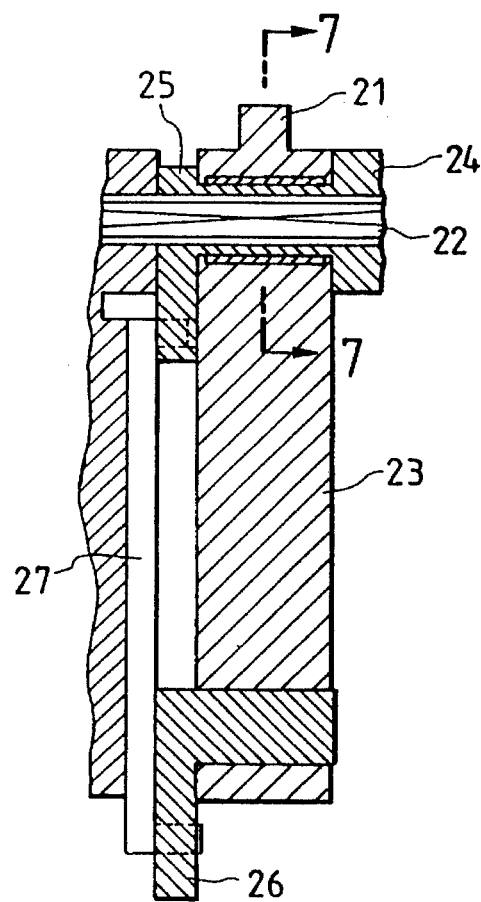
FIG. 6 is a longitudinal sectional side view of the main portions of the above reel.
Figure 7:
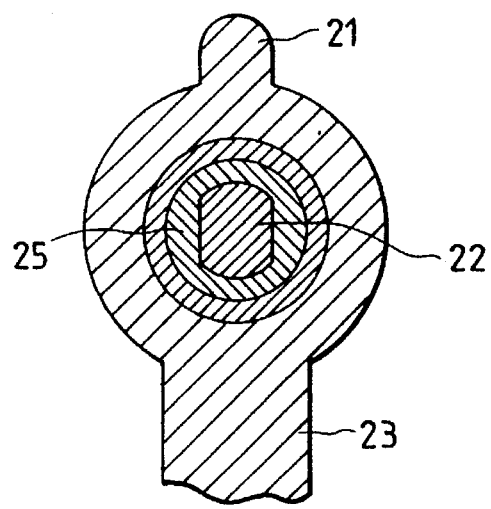
FIG. 7 is a section view taken along the line 7—7 of FIG. 6.
Figure 8:
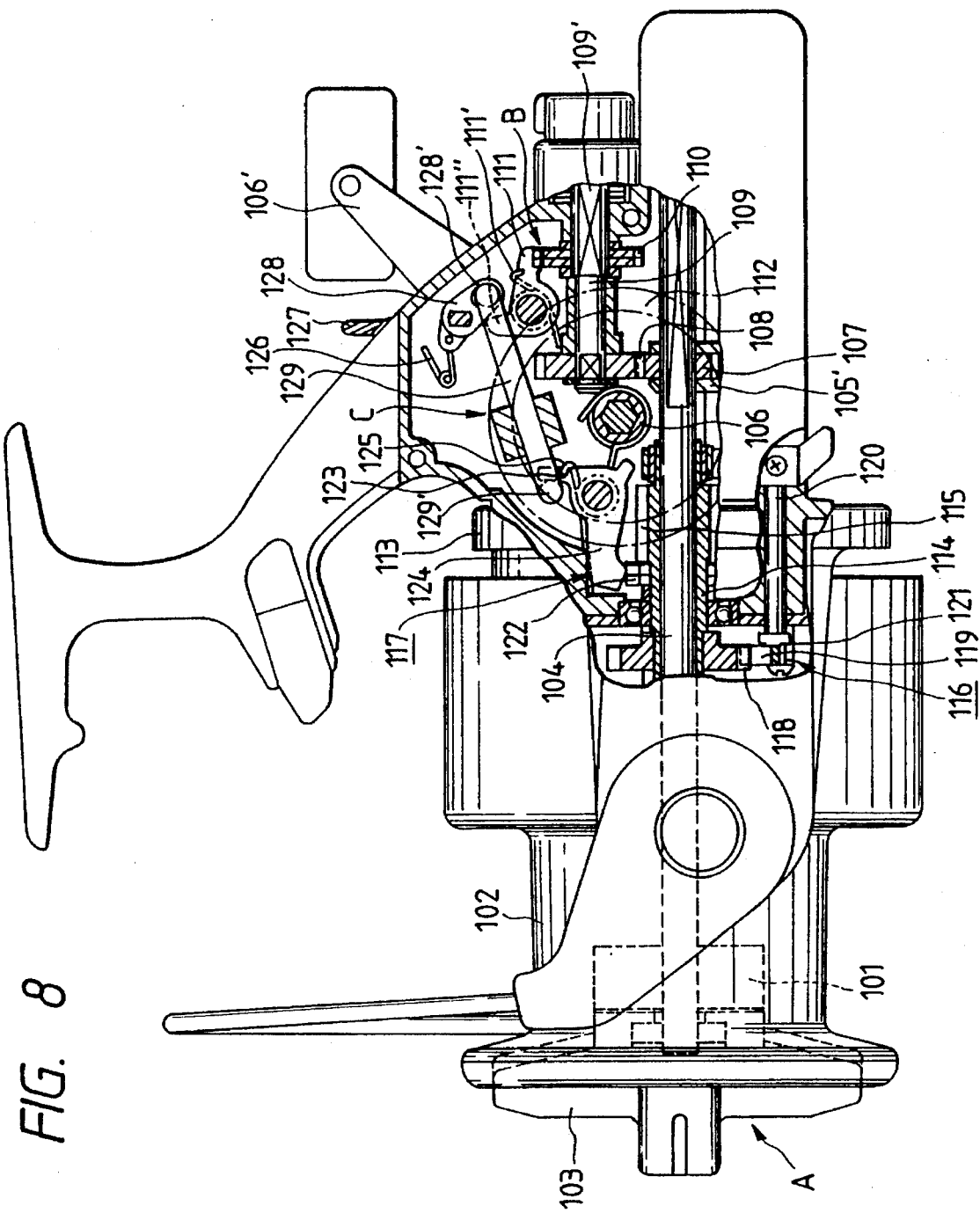
FIG. 8 is a partially cutaway front view of a spinning reel for fishing according to a second embodiment of the invention.

On the other hand, a control plate 20 having an engaging recessed portion 19 is supported by the rear and upper portion of the reel main body 5 in such a manner that the control plate 20 can be slid back and forth with an operation knob 20', and a support piece 23 having a projection 21 engageable with the engaging recessed portion 19 is rotatably supported by a support shaft 22 which is axially supported by the reel main body 5. Therefore, if the control plate 20 is slid upwardly by the operation knob 20', then the support piece 23 is rotated about the support shaft 22 to move down the other leading end thereof as shown in FIGS. 4 and 5.

Also, in the rear and upper portion of the reel main body 5, there is provided a linking mechanism C which includes a switch-over lever 24 and a rotary piece 25 both fixed integrally to the support shaft 22, and further includes a switch-over piece 26 pivotably supported on the leading end portion of the support piece 23, a connecting rod 27 pivotably supported on the respective leading end portions of the switch-over piece 26 and rotary piece 25, and a spring 28 for energizing the rotary piece 25 in the mutually opposing directions selectively. If the switch-over lever 24 is rotated from its front position shown in FIG. 4 to its rear position shown in FIG. 5, then the rotary piece 25 rotates the switch-over piece 26 clockwise through the connecting rod 27 to thereby release the pressing action to a projecting piece 18" provided in the securing pawl 18 of the reversal preventive device 16. Thus, the securing pawl 18 is engaged with the reversal preventive pawl 17 due to the energization force of the spring 18'.

Further, an operation projecting portion 29 is formed the end portion of the switch-over member 11 opposite from the engaging end portion thereof in such a manner that it is engageable with the other engaging portion 25' of the rotary piece 25. The operation projection portion 29 is also engageable with or abuttable against a return projection 30 formed on the peripheral edge portion of the drive gear 12 when the switch-over member 11 is situated at a position spaced apart from the securing gear 10. Therefore, if the drive gear 12 is rotated by rotating the handle shaft 6, then the return projection 30 is brought into abutment with the operation projecting portion 29 of the switch-over member 11 at the spaced position to push and rotate the switch-over member 11 to thereby engage the same with the securing gear 10, as well as to rotate the rotary piece 25 counterclockwise against the spring 28 to thereby return the switch-lever 24 to the upper rotary position.

Next, the operation of the spinning reel thus constructed will be described hereafter.

Figure 2:
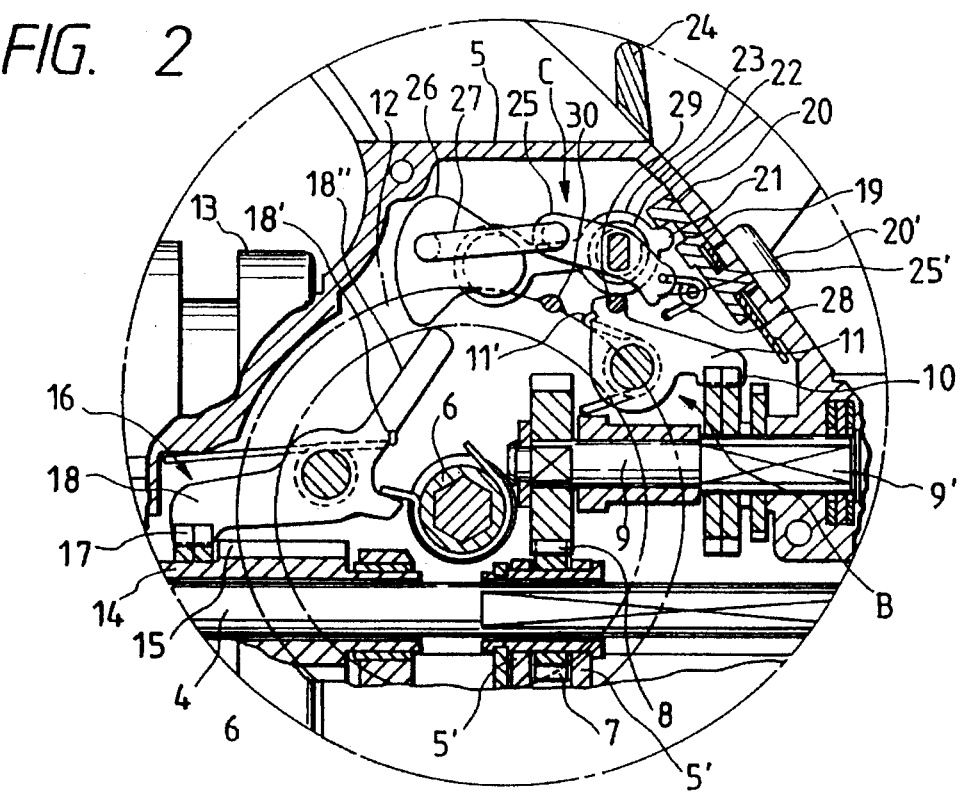
FIG. 2 is a longitudinal sectional front view of the above reel, showing a state in which a normal drag mechanism is used.

If the operation knob 20' is switched over to the lower position and the switch-over lever 24 is switched over to the upper rotary position as shown in FIG. 2, then the securing pawl 18 of the reversal preventive device 16 is engaged with the reversal preventive ratchet wheel 17 to thereby prevent the reverse rotation of the rotor 13 and, at the same time, the switch-over member 11 of the switch-over mechanism B is engaged with the securing gear 10 to thereby secure the spool shaft 4, which makes it possible to perform a normal fishing operation using the drag mechanism A.

Figure 3:
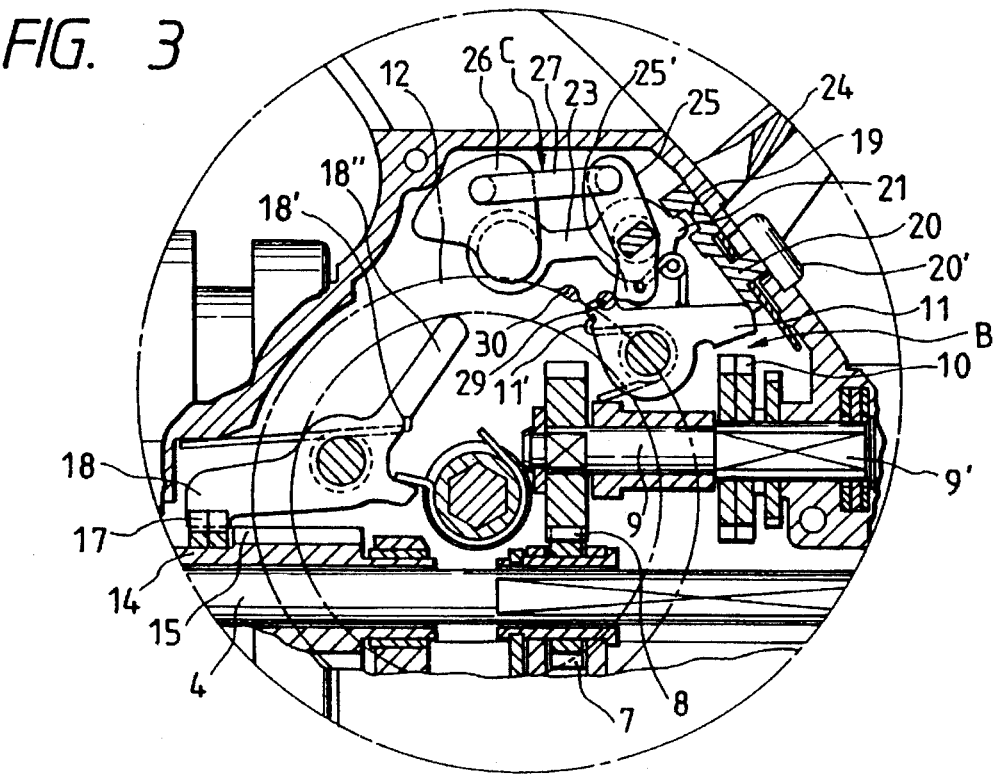
FIG. 3 is a longitudinal sectional front view of the above reel, showing a state in which a spool shaft is held in the freely rotatable state.

Next, if the switch-over lever 24 is rotated downwardly from this state, as shown in FIG. 3, then the rotary piece 25 is rotated clockwise to thereby draw and rotate the switch-over piece 26 upwardly and, at the same time, the engaging portion 25' is engaged with the operation projecting portion 29 of the switch-over member 11 to push and rotate the same to thereby disengage the switch-over member 11 from the securing gear 10, so that the spool shaft 4 can be held in the freely rotatable state. To return this state again to the state shown in FIG. 2, the operation that the switch-over lever 24 is rotated upwardly suffices. Alternatively, the handle 6' may be rotated to rotate the drive gear 12. That is, the rotation of the drive gear causes the return projection 30 to be brought into abutment with the operation projecting portion 29 to rotate both the switch-over member 11 and rotary piece 25 to thereby bring the switch-over member 11 into engagement with the securing gear 10 as well as to return the switch-over lever 24 to the upper position.

Next, in the state shown in FIG. 2, if the control plate 20 is slid up to the upper position by use of the operation knob 20' as shown in FIG. 4, then the support piece 23 in engagement with the engaging recessed portion 19 of the control plate 20 is rotated counterclockwise by means of the projection to move down the switch-over piece 26 into pressure engagement with the projecting piece 18" of the securing pawl 18 to thereby disengage the securing pawl 18 from the reversal preventive ratchet wheel 17 against the force of the spring 18', so that the rotor 13 is switched over to the forwardly and reversely rotatable state and thus the rotor reversible fishing is possible.

Also, as shown in FIG. 5, if the switch-over lever 24 is rotated down to the lower position from the above state, then the switch-over piece 26 is pulled upwardly by means of the rotation of the rotary piece 25 through the connecting rod 27 to release the pressure engagement action of the switch-over piece 26 onto the projecting piece 18" of the securing pawl 18, so that the securing pawl 18 is brought into engagement with the reversal preventive ratchet wheel 17 due to the energization force of the spring 18' to thereby prevent the reverse rotation of the rotor 13, and simultaneously the engaging portion 25' of the rotary piece 25 is pressed against the operation projecting portion 29 to thereby disengage the switch-over member 11 from the securing gear 10, so that the spool shaft 4 is now held in the freely rotatable state. The rotation of the switch-over lever 24 up to the upper position can return this state back to the state shown in FIG. 4. Alternatively, if the drive gear 12 is rotated in the fishline take-up direction by rotating the handle 6, then the return projection 30 is brought into abutment with the operation projecting portion 29 to thereby rotate the switch-over member 11 and rotary piece 25, so that the current state can be returned to the state shown in FIG. 4.

As has been described heretofore, by operating the switch-over lever 24 of the linking mechanism C and the operation knob 20' of the control device 20 selectively, it is possible to perform a normal fishing operation using the drag mechanism A as shown in FIG. 2, a fishing operation as shown in FIGS. 3 and 5 in which the spool shaft is held in the freely rotatable state allowing the spool shaft to be rotated reversely, and a fishing operation as shown in FIG. 4 in which the rotor is held in the forwardly and reversely rotatable state allowing the rotor to be rotated reversely, selectively as desired. In particular, the switch-over operation between the forwardly and reversely rotatable state of the rotor shown in FIG. 4 and the freely rotatable state of the spool shaft can be performed quickly, easily and positively by the switch-over lever 24 or by an automatic return means using the rotation of the handle, which is very convenient for a fishing operation using these states successively or alternatively.

According to the first embodiment of the present invention, the reversal preventive device of the rotor is connected with the switch-over mechanism for switching over the spool shaft between the drag operative state and the freely rotatable state by the linking mechanism in such a manner that, when the reversal preventive device prevents the reverse rotation of the rotor, the switch-over mechanism holds the spool shaft in the freely rotatable state and, when the reversal preventive device releases the prevention of the reverse rotation of the rotor, the switch-over mechanism holds the spool shaft in the secured state. Further, the linking mechanism further includes control means which can switch over the reversal preventive device into the free state. Thanks to this, the spinning reel for fishing according to the embodiment permits selective and proper use of various fishing methods including a fishing method which uses the normal drag mechanism by means of the selective switch-over operation of the linking mechanism and control means, a fishing method which holds the spool shaft in the freely rotatable state, and a rotor reversible fishing method which holds the rotor in the reversely rotatable state; that is, the present spinning reel for fishing can deal with a wide variety of fishing methods. Especially, switch-over between the freely rotatable state of the spool and the reversely rotatable state of the rotor can be carried out quickly and easily only by operating the switch-over lever without switching over the reversal preventive device each time and, therefore, a fishing operation in which these switching operations must be carried out continuously can be performed positively as well as smoothly and quickly.

Also, the spinning reel according to the embodiment can deal with the above-mentioned various fishing operations only by providing a single reversal preventive device in the rotor and thus can simplify the structure thereof, so that the reel main body itself can be made light and compact.

Further, according to the embodiment, the switch-over operations to switch over the spool shaft from the freely rotatable state to the normal drag mechanism operative state and to switch over the rotor into the reversely rotatable state can be performed automatically by the automatic return means using the rotation of the handle in addition to the switch-over lever, so that the above switch-over operations can be carried out more quickly, easily and positively. Due to this, the operationability and thus the utility value of the present spinning reel for fishing can be enhanced.

Second Embodiment

FIGS. 8 to 12 show a spinning reel for fishing according to a second embodiment of the present invention.

A drag mechanism A having a friction brake member 101 and a control knob 103 for pressing the friction brake member 101 against a spool 102 is mounted in a well known manner in a front portion of a spool shaft 104. The spool shaft 104 is supported by a reel main body 105 in such a manner that it is slidable in the axial direction thereof and is also rotatable. A known reciprocative sliding mechanism (not shown) is provided for the spool shaft 104, and thus the spool shaft 104 can be slid back and forth in linking with the rotation of a handle shaft 106 including a handle 106'.

A transmission gear 107 is held by the reel main body 105 and fitted on the spool shaft 104 such that it can be rotated integrally with the spool shaft 104 and can slide relative to the spool shaft 104. The position of the transmission gear 107 in the axial direction of the spool shaft 104 is restricted by a support portion 105' of the reel main body 105. In the rear portion of the reel main body 105 located above the spool shaft 104, there is supported a linking shaft 109 to which is fixed a driven gear 8 meshable with the transmission gear 107. The linking shaft 109 is formed with a cutaway circular shaft portion 109' on which a securing gear 110 is provided integrally therewith. On the other hand, in the reel main body 105, there is supported a switch-over member 111 which is engageable with and disengageable from the securing gear 110 and is energized in the engaging direction thereof by a spring 111'. In this manner, a switch-over mechanism B is provided, which can switch over the spool shaft 104 between the secured state and freely rotatable state by engaging the switch-over member 111 with the securing gear 110 or disengaging the switch-over member 111 from the securing gear 110.

A drive gear 112, which can be rotated through the handle shaft 106 when the handle 106' is rotated, is in mesh with a pinion 115 formed on a rotor rotary shaft cylinder 114 to which a rotor 113 is fixed. On the rotor rotary shaft cylinder 114, there are provided a first reversal preventive device 116 (corresponding to a second reversal preventive device in claims) and a second reversal preventive device 117 (corresponding to a first reversal preventive device in claims) for preventing the reverse rotation of the rotary shaft cylinder 114.

In particular, the first reversal preventive device 116 includes a reversal preventive ratchet wheel 118 fixed to the portion of the rotor rotary shaft cylinder 114 existing in the outer front portion of the reel main body 105, a securing pawl 119 engageable with and disengageable from the reversal preventive ratchet wheel 118, and an operation lever 120 supported by the reel main body 105 for holding the securing pawl 119 in the engageable or disengageable state. The first reversal preventive device 116 is operated such that, if the securing pawl 119 is engaged with the reversal preventive ratchet wheel 118 by means of a switch-over cam 121 provided at the leading end of the operation lever 120, then the reverse rotation of the rotor 113 is prevented and, on the other hand, if the securing pawl 119 is disengaged from the reversal preventive ratchet wheel 118, then the rotor 113 is allowed to rotate reversely.

Also, the second reversal preventive device 117 includes a reversal preventive gear 122 fixed to the portion of the rotor rotary shaft cylinder 114 existing within the reel main body 105, an engaging pawl 124 having an operation projection piece 123 at one end thereof and engageable with and disengageable from the reversal preventive gear 122, and a spring 125 for energizing the engaging pawl 124 in the engaging direction thereof. The second reversal preventive device 117 is operated, similarly to the first reversal preventive device 116, such that, if the engaging pawl 124 is in engagement, then the reverse rotation of the rotor 113 is prevented and, if disengaged, then the reverse rotation of the rotor 113 is allowed.

The second reversal preventive device 117 and the switch-over mechanism B are structured such that they can be operated in linking with each other by a linking mechanism C including a switch-over lever 127. That is, the linking mechanism C includes an operation piece 128, which is pivotably supported by the reel main body 105 and provided with the switch-over lever 127 the position of which can be regulated selectively in the back and forth direction of the reel main body 105 by an energization spring 126, and a connecting rod 129 slidably supported by the reel main body 105. One end of the connecting rod 129 is pivotably supported by a projecting portion 128' provided on the operation piece 128, the projecting portion 128' is engageable with an operation portion 111" formed in the switch-over member 111 included in the switch-over mechanism A, and a folded projecting piece 129' formed in the other end of the connecting rod 129 is engageable with the operation projection piece 123 of the engaging pawl 124 to be able to draw the same rearwardly.

Figure 9:
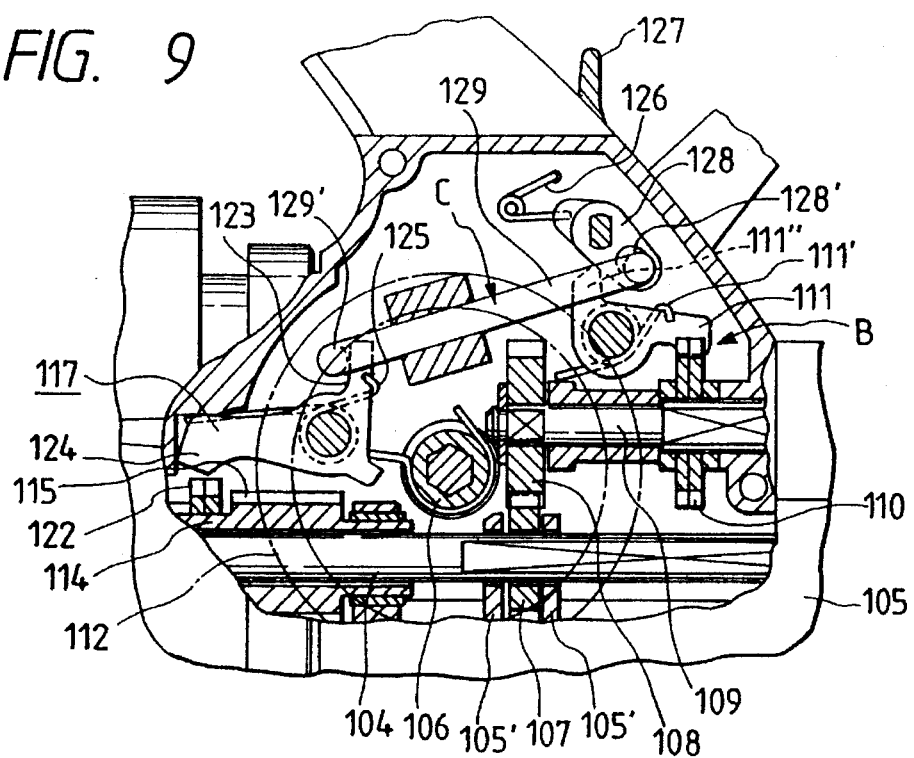
FIG. 9 is a longitudinal front view of the main portions of the second embodiment, showing the operating state thereof.

Since the embodiment of the invention is structured in the above-mentioned manner, in a state in which the securing pawl 119 is engaged with the reversal preventive ratchet wheel 118 by the operation lever 120 of the reversal preventive device 116 to thereby prevent the reverse rotation of the rotor, when the switch-over lever 127 of the linking mechanism C is rotated and positioned in the front, upper portion of the reel main body 105 as shown in FIG. 9, the operation piece 128 draws the connecting rod 129 and the folded projecting piece 129' of the connecting rod 129 in turn draws the operation projection piece 123 of the engaging pawl 124 of the second reversal preventive device 117 to thereby disengage the securing pawl 124 from the reversal preventive gear 122, while the switch-over member 111 of the switch-over mechanism B is energized by the spring 111' so that it is engaged with the securing gear 110 and is thereby secured to the spool shaft 104. Consequently, the spool shaft 104 is held in a fixed state and the spool 102 is now held in a state in which fishing due to a normal drag brake operation by the friction brake member 101 can be played.

Figure 10:
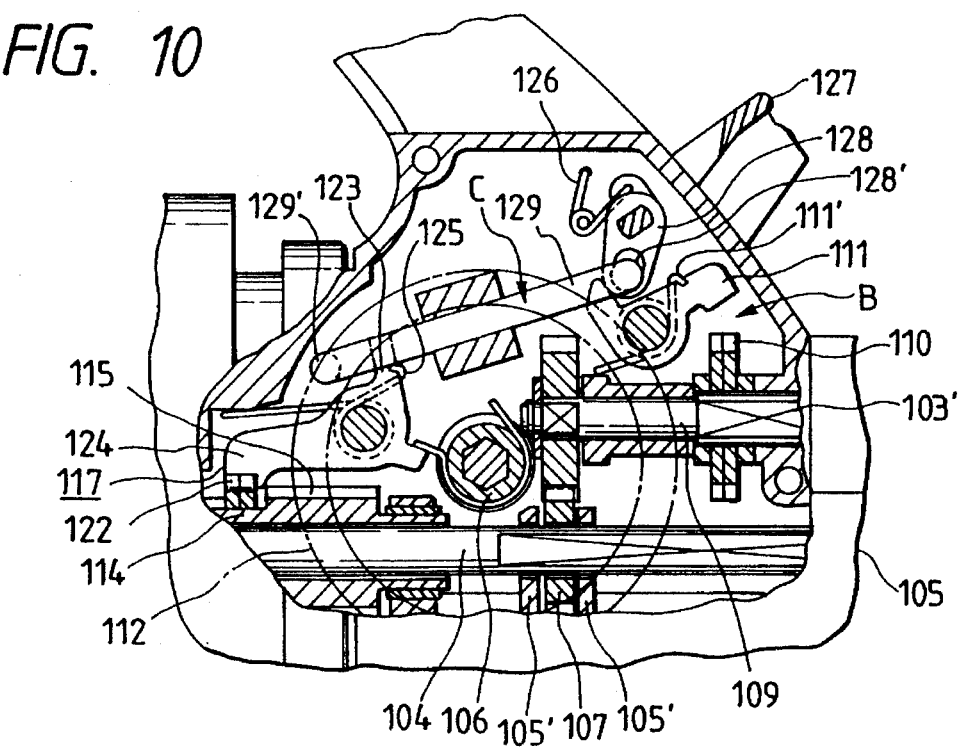
FIG. 10 is a longitudinal front view of the main portions of the second embodiment, showing the operating state thereof.
Figure 11:
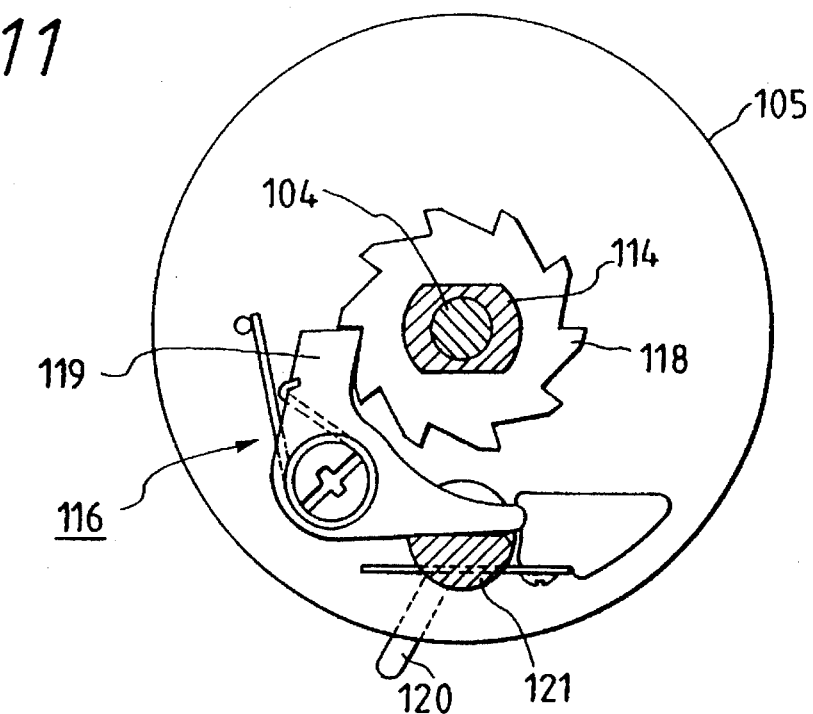
FIG. 11 is a side view of a reversal preventive device employed in the second embodiment, showing a state in which a rotor is prevented against reverse rotation.

After then, when the switch-over lever 127 of the linking mechanism C is rotated to a backward lower position shown in FIG. 10 from the above state, the projecting portion 128' of the operation piece 128 is engaged with the operation portion 111" of the switch-over member 111 of the switch-over mechanism B to rotate the switch-over member 111 counterclockwise to thereby disengage the same from the securing gear 110 and, at the same time, the folded projecting piece 129' of the connecting rod 129 removes its drawing action of the operation projection piece 123 of the engaging pawl 124 so that the engaging pawl 124 can be engaged with the reversal preventive gear 122 due to the energizing force of the spring 125. Consequently, while the rotor 113 is prevented from rotation by both the first reversal preventive device 116 and second reversal preventive device 117, the spool shaft 104 is switched over into the freely rotatable state, so that the spool 102 can be held in the freely rotatable state.

Figure 12:
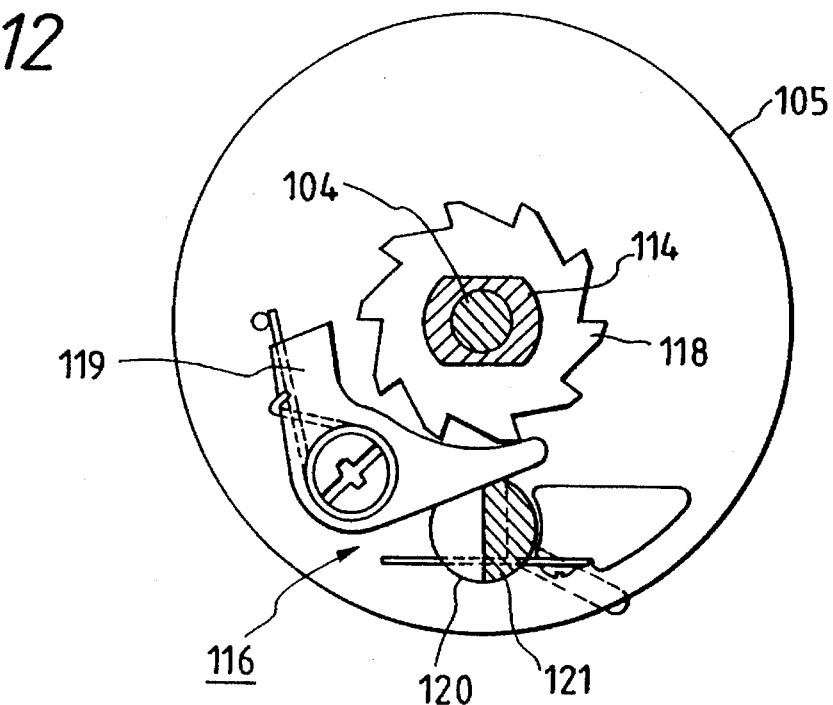
FIG. 12 is a side view of the above reversal preventive showing, showing a state in which a rotor is rotatable.

Also, in a state in which the securing pawl 119 of the reversal preventive device 116 is disengaged from the reversal preventive ratchet wheel 118 by the operation lever 120 as shown in FIG. 12, if the switch-over lever 127 of the linking mechanism C is rotated and positioned at a front, upper position shown in FIG. 9, then the engaging pawl 124 of the second reversal preventive device 117 is disengaged from the reversal preventive gear 122 and the switch-over member 111 of the switch-over mechanism B is engaged with the securing gear 110 to thereby hold the spool shaft 104 in the secured state, so that the rotor 113 can be rotated forwardly and reversely and thus the rotor reversible fishing can be played.

Further, in this state, if the switch-over lever 127 is rotated and positioned at the back, lower position as shown in FIG. 10, then the engaging pawl 124 of the second preventive device 117 is engaged with the reverse preventive gear 122 to thereby prevent the reverse rotation of the rotor 113 and the switch-over member 111 of the switch-over mechanism B is disengaged from the securing gear 110, so that the spool shaft 104 can be held in the freely rotatable state.

In the above-mentioned embodiment, the first reversal preventive device 116 and second reversal preventive device 117 for preventing the reverse rotation of the rotor are both provided in the rotor rotary shaft cylinder 114. However, this is not limitative, but alternatively, the first reversal preventive device 116 can be provided in the handle shaft 106. Also, the linking mechanism including the switch-lever can be replaced with other equivalent means, but the slidable connecting rod system employed in the above-mentioned embodiment is advantageous in that the operation thereof can be performed smoothly and a more simplified structure can be provided.

As has been described heretofore, according to the embodiment of the invention, there is provided the second reversal preventive device in the rotor and the second reversal preventive device is connected to the switch-over mechanism for switching over the spool shaft between the drag operation state and the freely rotatable state by the linking mechanism, while the linking mechanism is structured such that, when the second reversal preventive device prevents the reverse rotation of the rotor, the switch-over mechanism holds the spool shaft in the freely rotatable state and, when the second reversal preventive device removes the prevention of the reversal rotation of the rotor, the switch-over mechanism holds the spool shaft in the secured state. Thanks to this, a fishing method which uses the normal drag mechanism by means of the rotor reversal preventive device and the switch-over operation of the linking mechanism, a fishing method which holds the spool in the freely rotatable state, and a rotor reversible fishing method which holds the rotor in the reversible state can be selectively used to suit the occasion, thereby allowing the invention to be applied over a wide range of fishing methods. In particular, the switch-over operation between the freely rotatable state of the spool and the forwardly and reversely rotatable state of the rotor can be made quickly and easily without performing the switch-over operation of the rotor reversal preventive device each time. This makes it possible to perform positively, smoothly and quickly a fishing operation in which these switch-over operations must be performed continuously.

Also, according to the embodiment, due to the fact that the first reversal preventive device and second reversal preventive device are respectively disposed in the inside and outside of the reel box on the rotor rotary shaft cylinder, it is possible to secure a sufficient space for installation of the linking mechanism and thus the present spinning reel for fishing can be made compact without enlarging the size of the reel main body.

What is claimed is:

1. A spinning reel for fishing, comprising:

a reel main body;

a spool rotatably arranged with respect to said reel main body;

a drag mechanism for frictionally coupling said spool to said reel main body;

a rotor rotatably arranged with respect to, said reel main body for winding a fishline onto said spool;

a switch-over mechanism for switching over said spool between a secured state and a freely rotatable state, wherein said drag mechanism frictionally couples said spool to said reel main body in said secured state;

a first reversal preventive device for switching over said rotor between a first reversal preventive state and a first reversal permissible state;

a linking mechanism having a switch-over lever for coupling said switch-over mechanism to said first reversal preventive device such that said first reversal preventive device is activated to switch said rotor into said reversal permissible state when said switch-over mechanism switches said spool into said secured state, and that said first reversal preventive device is activated to switch said rotor into said reversal preventive state when said switch-over mechanism switches said spool into said freely rotatable state.

2. A spinning reel for fishing according to claim 1, further comprising:

control means for switching over said rotor between a second reversal preventive state and a second reversal permissible state when said spool is in said secured state.

3. A spinning reel for fishing according to claim 2, wherein said rotor is rotatable in a first direction and is prevented from rotating in a second direction opposite to said first direction when said rotor is in said second reversal preventive state, and said rotor is rotatable in both said first and second direction in linking with a handle when said rotor is in said second reversal permissible state.

4. A spinning reel for fishing according to claim 1, further comprising:

control means connected to said linking mechanism to selectively suppress function of said linking mechanism such that said first reversal preventive device can not switch said rotor from said first reversal preventive state to said first reversal permissible state even if said switch-over mechanism switches said spool from said freely rotatable state to said secured state.

5. A spinning reel for fishing according to claim 1, further comprising:

automatic return means for returning said spool from said freely rotatable state to said secured state in linking with rotation of a handle.

6. A spinning reel for fishing according to claim 1, further comprising:

a second reversal preventive device for switching over said rotor between a second reversal preventive state and a second reversal permissible state, said second reversal preventive device being independently operated from said first reversal preventive device.

7. A spinning reel for fishing according to claim 6, wherein said rotor is rotatable in a first direction and is prevented from rotating in a second direction opposite to said first direction when said rotor is in at least one of said first and second reversal preventive state.

8. A spinning reel for fishing according to claim 7, wherein said rotor is rotatable in both said first and second directions in linking with a handle when said rotor is in both of said first and second reversal permissible states.

9. A spinning reel for fishing according to claim 6, wherein both of said first and second reverse rotation preventive device is provided on a rotary quill to which said rotor is fixed.

10. A spinning reel for fishing according to claim 1, wherein said spool is frictionally coupled to said reel main body through said drag mechanism when said spool is in said secured state, and said spool is free from said reel main body when said spool is in said freely rotatable state.

11. A spinning reel for fishing according to claim 1, wherein said rotor is rotatable in a first direction and is prevented from rotating in a second direction opposite to said first direction when said rotor is in said first reversal preventive state, and said rotor is rotatable in both said first and second direction in linking with a handle when said rotor is in said first reversal permissible state.

* * * * *